(12) United States Patent
McLachlan et al.

(10) Patent No.: US 8,656,363 B2
(45) Date of Patent: Feb. 18, 2014

(54) SYSTEM AND METHOD FOR ENTROPY POOL VERIFICATION

(75) Inventors: Jon McLachlan, San Francisco, CA (US); Julien Lerouge, Santa Clara, CA (US); Nicholas T. Sullivan, Sunnyvale, CA (US); Ganna Zaks, Mountain View, CA (US); Augustin J. Farrugia, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 854 days.

(21) Appl. No.: 12/815,298

(22) Filed: Jun. 14, 2010

(65) Prior Publication Data

US 2011/0307873 A1 Dec. 15, 2011

(51) Int. Cl.
  G06F 9/44 (2006.01)
  G06F 11/30 (2006.01)
  G06F 12/14 (2006.01)

(52) U.S. Cl.
  USPC ............ 717/126; 717/124; 717/132; 713/187

(58) Field of Classification Search
  None
  See application file for complete search history.

(56) References Cited

U.S. PATENT DOCUMENTS 7,823,135 B2 * 10/2010 Horning et al. ............... 717/127
7,904,892 B2 * 3/2011 Babb et al. .................... 717/144

OTHER PUBLICATIONS

David Aucsmith, "Tamper Resistant Software: An Implementation", 1996, Information Hiding Lecture note if computer science, vol. 1174, pp. 317-333.*
Bill Horne, "Dynamic Self-Checking Techniques for Improved Tamper Resustance", 2002, Springer, LNCS 2320, pp. 141-159.*
N. Alon, "Finding and Counting Given Length Cycles", 1995, Springer.*
N. Dedić, M. Jakubowski and R. Venkatesan, "A Graph Game Model for Software Tamper Protection," Lecture Notes in Computer Science, Proc. of the 9th international conference on Information Hiding, Saint Malo, France, 2007, vol. 4567/2007, pp. 80-95, 2007, Springer Berlin/Heidelberg.
Walter J. Hayden, Captain, USAF, "Locating Encrypted Data Hidden Among Non-encrypted Data Using Statistical Tools," Master's Thesis, Air Force Institute of Technology, Mar. 5, 2007.
Fredrik Lillehagen Skarderud, "Protecting Sensitive Data on a PC by a Custom Algorithm," Dept. of Computer Science and Media Technology, Gjøvik University College, Norway, 2005.
Brecht Wyseur, "Software Security," Katholike Universiteit Leuven, Belgium, COSIC Course, Jul. 8, 2009.
Donald E. Knuth, "The Art of Computer Programming, vol. 2: Seminumerical Algorithms (3rd Edition)," 1997, pp. 7 and 539 (title page, table of contents), Addison-Wesley Longman, Inc., Reading, Massachusetts.
"Cycle detection," From Wikipedia, the free encyclopedia, Wikimedia Foundation Inc., San Francisco, CA (Jun. 9, 2010).

* cited by examiner

Primary Examiner — Lewis A Bullock, Jr.
Assistant Examiner — Mark Gooray
(74) Attorney, Agent, or Firm — Novak Druce Connolly Bove + Quigg LLP

(57) ABSTRACT

Disclosed are systems, methods, and non-transitory computer-readable storage media for detecting changes in a source of entropy. A system configured to practice the method generates a cyclic graph based at least in part on the values in the entropy pool. Using the cyclic graph and one or more starting points, the system establishes one or more baseline properties for the cyclic graph. These properties can include the number of steps required to identify a cycle in the graph or the number of steps required to traverse the graph from one or more starting points to a selected end point. The computed properties are then stored for later use. As execution progresses, the system monitors the entropy pool to detect a change by regenerating the cyclic graph and using the stored properties.

13 Claims, 11 Drawing Sheets

SYSTEM AND METHOD FOR ENTROPY POOL VERIFICATION

BACKGROUND

1. Technical Field

The present disclosure relates to dynamic code obfuscation and more specifically to detecting changes in a source of entropy used by a dynamic obfuscation technique.

2. Introduction

Software developers invest considerable resources in the development and maintenance of computer software. This investment often results in the development of proprietary algorithms that are advantageous over those used by the competition and which the developer would like to keep secret so as to leverage the superiority of the algorithm. In addition to proprietary algorithms, software may also contain other embedded secrets such as cryptographic keys. Because of the plethora of important information, software is often the target of various reverse engineering efforts to dissect, analyze, and discover how it works.

One approach to thwart reverse engineering is code obfuscation. Code obfuscation is a semantics-preserving transformation that makes the program more difficult to understand while preserving the original functionality of the program. Most of the commonly used obfuscation techniques rely solely on statically available information in the transformation. These static obfuscation techniques help deter against certain forms of reverse engineering, however, because they only rely on statically available information, the execution of the program will be the same every time the program executes. To complicate the reverse engineering process, a software developer can apply a dynamic code obfuscation technique that will cause the program's execution to vary from one computer to the next and from one execution to the next, while still preserving the original functionality of the program. An important aspect of a dynamic code obfuscation technique is a source of entropy that can be used to cause variation in the program's execution. Unfortunately, the source of entropy can also be a major weakness because an attacker can simply modify the entropy pool in order to control the variation.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for detecting changes in a source of entropy. Entropy is used to provide random data to an executing program and is particularly useful as part of a software protection mechanism. By incorporating entropy into the protection mechanism, it is possible to create a program in which the execution varies for different instantiations of the program, while still producing the same results. This is accomplished by varying the composition of the entropy. This variation can make it more difficult to reverse engineer the software since an attacker is unable to exactly replicate a particular execution sequence. However, the source of entropy is also a target of a reverse engineering attack. If the attacker is able to replace the entropy then the attacker can force a deterministic execution. A failure to detect a change in the entropy pool significantly weakens any protection mechanism that relies on the entropy.

In some embodiments, a system configured to practice the method includes a module configured to control a processor to generate a cyclic graph based at least in part of on a set of values in an entropy pool. Using the cyclic graph and a selected starting point, the system establishes baseline properties for the cyclic graph. In some embodiments, the baseline is established by computing the number of steps required to identify a cycle in the cyclic graph from the selected starting point. Once computed, the number of steps is stored for later use. As execution progresses, the system monitors the entropy pool by regenerating the cyclic graph and recalculating the number of steps required to identify a cycle from the selected starting point. The system generates a flag if the recalculated number of steps differs from the baseline number of steps.

In some embodiments, the system establishes a baseline by computing the number of steps from one or more selected starting points to a selected end point. Once computed, the number of steps is stored for later use. At some later point, the system regenerates the cyclic graph and selects one of the starting points. The system then obtains a step count associated with the starting point and uses it to traverse the cyclic graph to arrive at an end point. The value associated with the end point is then returned.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for techniques to detect changes in a source of entropy used by a software protection mechanism. The disclosure first sets forth a discussion of a basic general purpose system or computing device in FIG. 1 that can be employed to practice the concepts disclosed herein. Next, the disclosure turns to a brief discussion of the general concept of an entropy pool and how it is used in a software protection mechanism. The disclosure then proceeds with two exemplary method embodiments and an illustrative example.

Figure 1:
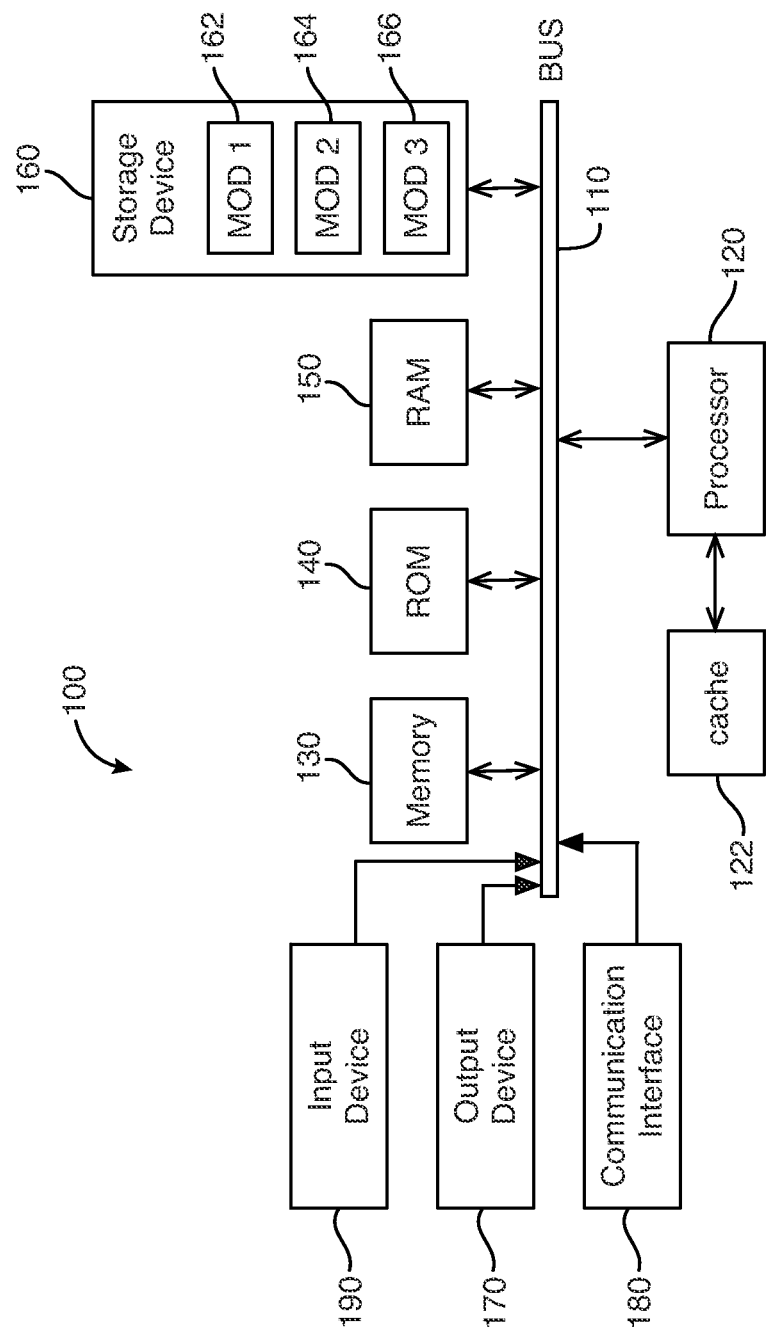
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache for quick access by the processor 120. In this way, the cache provides a performance boost that avoids processor 120 delays while waiting for data. These and other modules can be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Having disclosed some basic system components, the disclosure now turns to brief discussion of the concept of an entropy pool and how it is used in a software protection mechanism. For the purpose of this disclosure, an entropy pool is a set of values that the software has access to during execution. The pool can be stored in any number of locations with the only constraint being that the pool is persistent during execution. That is, the pool should be stored in a manner that performing the same action more than once will yield the same piece of entropy. For example, the entropy pool can be stored in memory, on the hard drive, on some external storage device, in any other storage media, and/or any combination thereof.

One purpose of an entropy pool is to provide random data to the executing program that can be used by the program's protection mechanism, such as an obfuscating transformation. In some protection mechanisms, different entropy data can lead to variations in the program's execution. If the data varies per execution, it may be more difficult for an attacker to reverse engineer the software. One technique to cause variation is to initialize the entropy pool with random values each time the program runs. However, as with all other aspects of the execution, an attacker may be able to observe this initialization, locate the entropy pool, and replace the contents. The replacement can have a number of side effects, but one of particular concern is that the attacker is able to force a deterministic execution by always replacing the entropy pool with the same data. A failure to detect this modification creates a significant weakness in the protection mechanism.

The approach disclosed herein addresses this weakness by providing a method to detect even small modifications to the entropy pool. The method can be incorporated into a protection mechanism that relies on an entropy pool or it can function as a stand-alone verification mechanism. The general approach is that given an entropy pool, such as an array of random values, the pool can be represented as a cyclic graph. At the time of entropy pool initialization, various properties are known about the cyclic graph. At a later point in time, the cyclic graph is again constructed from the entropy pool. If this newly constructed cyclic graph does not have the same properties as the original graph, then the entropy pool has been modified, even if the exact cause, source, or location of the modification may not be known.

Figure 2:
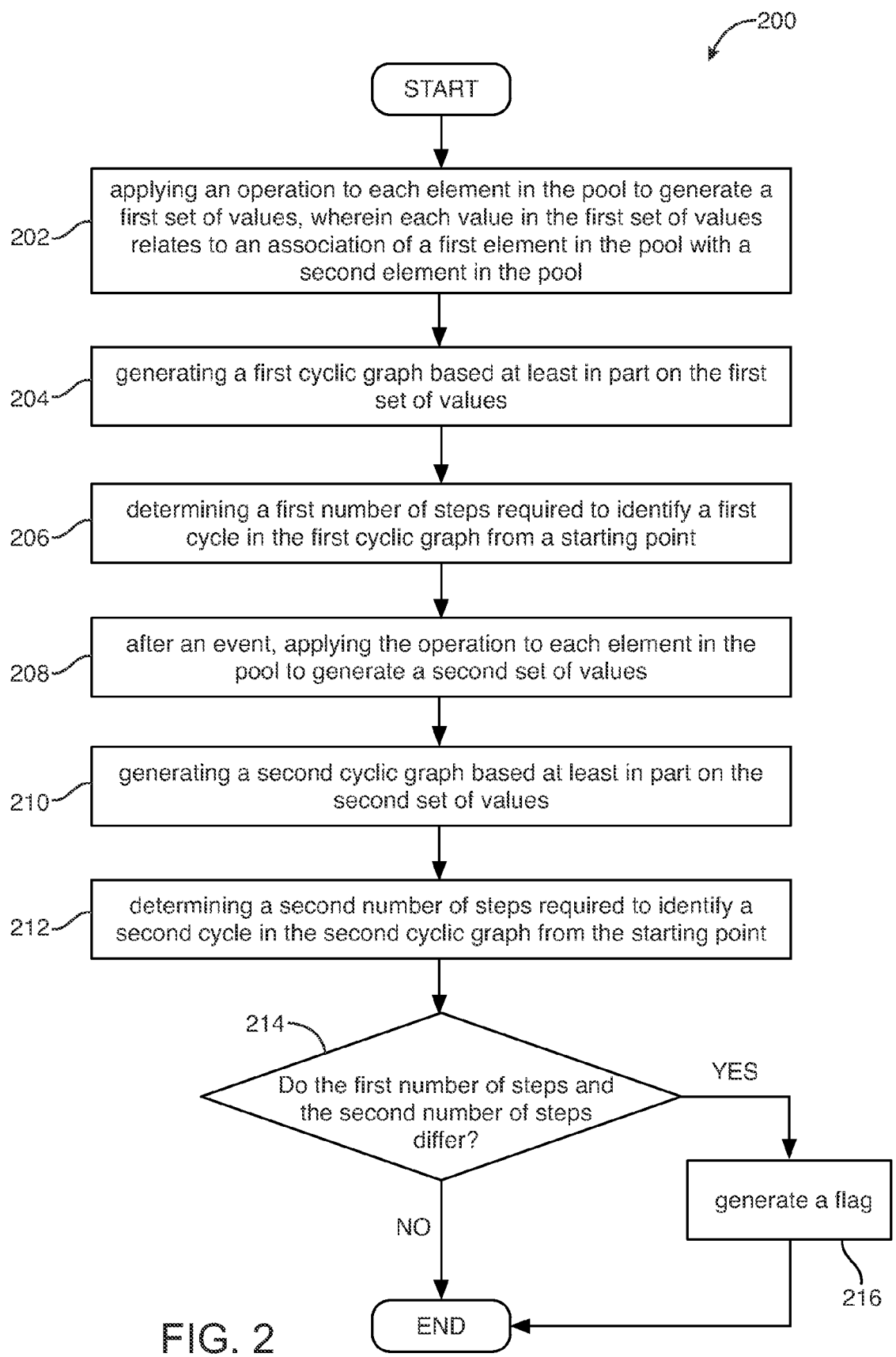
FIG. 2 illustrates a first example method embodiment.

Having disclosed some basic system components, the disclosure now turns to the exemplary method embodiment 200 shown in FIG. 2. For the sake of clarity, the method is discussed in terms of an exemplary system such as is shown in FIG. 1 configured to practice the method. FIG. 2 illustrates an example method embodiment for detecting changes in a set of values. A suitably configured system 100 can perform any and/or all of the steps of the method. Although specific steps are shown in FIG. 2, in other embodiments a method can have more or less steps than shown. First, the system 100 applies an operation to each element in the pool to generate a first set of values, wherein each generated value in the first set of values represents an association of a first element in the pool with a second element in the pool (202). In some embodiments, the pool of elements can be stored in an array and the operation can be a modulus by the size of the pool. This modulus operation will then result in mapping each element in the pool to an index in the array. Other methods of storage and operations are also possible. In some embodiments, the first element and the second element in the association can be the same element for one or more elements in the pool.

Next, the system 100 generates a first cyclic graph based at least in part on the first set of values generated in step 202 (204). A vertex can be created for each element in the pool and edges added between the vertices based on values generated in step 202. In some embodiments, the vertex can store the element, the index of that element in the array, and/or the generated value from step 202. Then a vertex x and a vertex y can be connected if the value generated for the element associated with vertex x equals the index associated with vertex y. The edge between vertex x and vertex y can be directed or undirected. This approach to graph construction will always yield a cyclic graph, as can be seen by the pigeonhole principle.

Using the first cyclic graph, the system 100 determines a first number of steps required to identify a first cycle from a starting point (206). In some embodiments, the first number of steps is stored in a set of most significant bits of the starting point element. For example, if the element is four bytes, the two most significant bytes can be used to store the step count. At some later point, the system 100 applies the operation used in step 202 to each element in the pool to generate a second set of values (208). Then the system 100 generates a second cyclic graph based at least in part on the second set of values (210). The second cyclic graph is constructed in the same manner as the first cyclic graph in step 204. Using the second cyclic graph, the system 100 determines a second number of steps required to identify a cycle from the starting point (212). In determining the second number of steps, the system 100 uses the same algorithm and the same starting point as was used in step 206 to determine the first number of steps.

Any number of algorithms can be used to determine the number of steps required to identify a cycle in steps 206 and 212. For example, a cycle can be detected using the tortoise and hare algorithm. This algorithm detects a cycle in a directed graph by maintaining two pointers to the graph, a tortoise pointer and a hare pointer. At each phase, the tortoise moves one vertex and the hare moves two. A cycle is detected when the tortoise and hare pointers both point to the same vertex. Using this algorithm, the step count required to identify a cycle can be the number of steps taken by the tortoise. Alternatively, a greedy approach can be used to detect the cycle. In the greedy algorithm, each time a step is taken from one vertex to the next, the vertex is marked to indicate that it has been seen. The process of stepping continues until a marked vertex is encountered. The choice of a cycle detection algorithm can be impacted by a number of factors, such as the representation used to model the cyclic graph and the efficiency of the algorithm. If steps 206 and/or 212 will be performed frequently, then selecting a more efficient cycle detection algorithm might be advantageous. Alternately, multiple cycle detection algorithms can be used to confirm each others findings. For example, if the system applies the tortoise and hare algorithm and detects a change, then the system can apply the greedy approach to confirm that the pool has changed. For example, the initial algorithm used can be highly efficient, and the confirming algorithm can be less efficient but more thorough.

Finally, the system 100 checks if the first number of steps and the second number of steps differ (214). If the number of steps differs, then a modification to the entropy pool has been detected and the system 100 generates a flag (216).

In addition to the various embodiments described above, a number of other properties in the exemplary method embodiment 200 are customizable based on the desired security and/or performance of the detection method. A first customizable aspect pertains to the starting point for the detection method. In some embodiments, only a single element will be used as the starting point. However, in other embodiments, multiple elements will be used. The number of elements selected can impact both the security and performance of the detection method. Selecting a greater number of starting points can improve the security because it leads to a greater percentage of pool coverage and therefore a greater likelihood of detecting a modification. However, selecting more starting points also requires performing the verification method multiple times, which takes more time and therefore can decrease performance. For example, in some embodiments, selecting every fourth element yields a total coverage of about thirty percent (30%) of the entropy pool while having a tolerable impact on performance. In some embodiments, a constant number or a constant ratio of starting points can be selected. For example, each time the detection method 200 is performed every fourth element is selected as a starting point. In some embodiments, a different number of starting points can be selected at different points in the program's execution. For example, a greater number of starting points can be selected for sections of the program that require more security or where performance is less critical. Alternatively, fewer starting points can be selected for sections of the program where performance is critical or where security is less of a concern. In some embodiments, the number of starting points selected can vary from one execution of the program to another.

A second customizable aspect of the detection is how much later and/or how often the system 100 performs steps 212 and 214. The timing and repetition of step 212 can be based on the desired security and/or performance of the detection method 200. The more frequently the system 100 performs steps 212 and 214, the greater the likelihood of detecting a change in the entropy pool. For example, finer grained checks may detect an attack in which the attacker only replaces the pool for a period of time before reinstating the original entropy pool. However, repeatedly performing steps 212 and 214 can negatively impact the performance of the protected software. In some embodiments, steps 212 and 214 can be performed at uniform intervals. However, in some embodiments, steps 212 and 214 can be performed more frequently in some sections of the software and less frequently in others. For example, steps 212 and 214 can be performed more frequently in sections of the program that require more security. Alternatively, steps 212 and 214 can be performed less frequently in sections of the program where achieving a particular performance benchmark is critical or where security is less of a concern.

Finally, the use the flag generated in step 216 depends on the protection mechanism. For example, the protection mechanism could trigger an immediate failure of the software; it could corrupt data used by the software that will lead to a failure at some later point in the execution; or it could prevent access to certain resources. The flag can include debug information. For example, the flag can include a listing of memory locations in the pool that are possible locations of the change. In one aspect, the flag is maintained locally to the device, but the flag can also be automatically or manually transmitted to a remote device.

Figure 3:
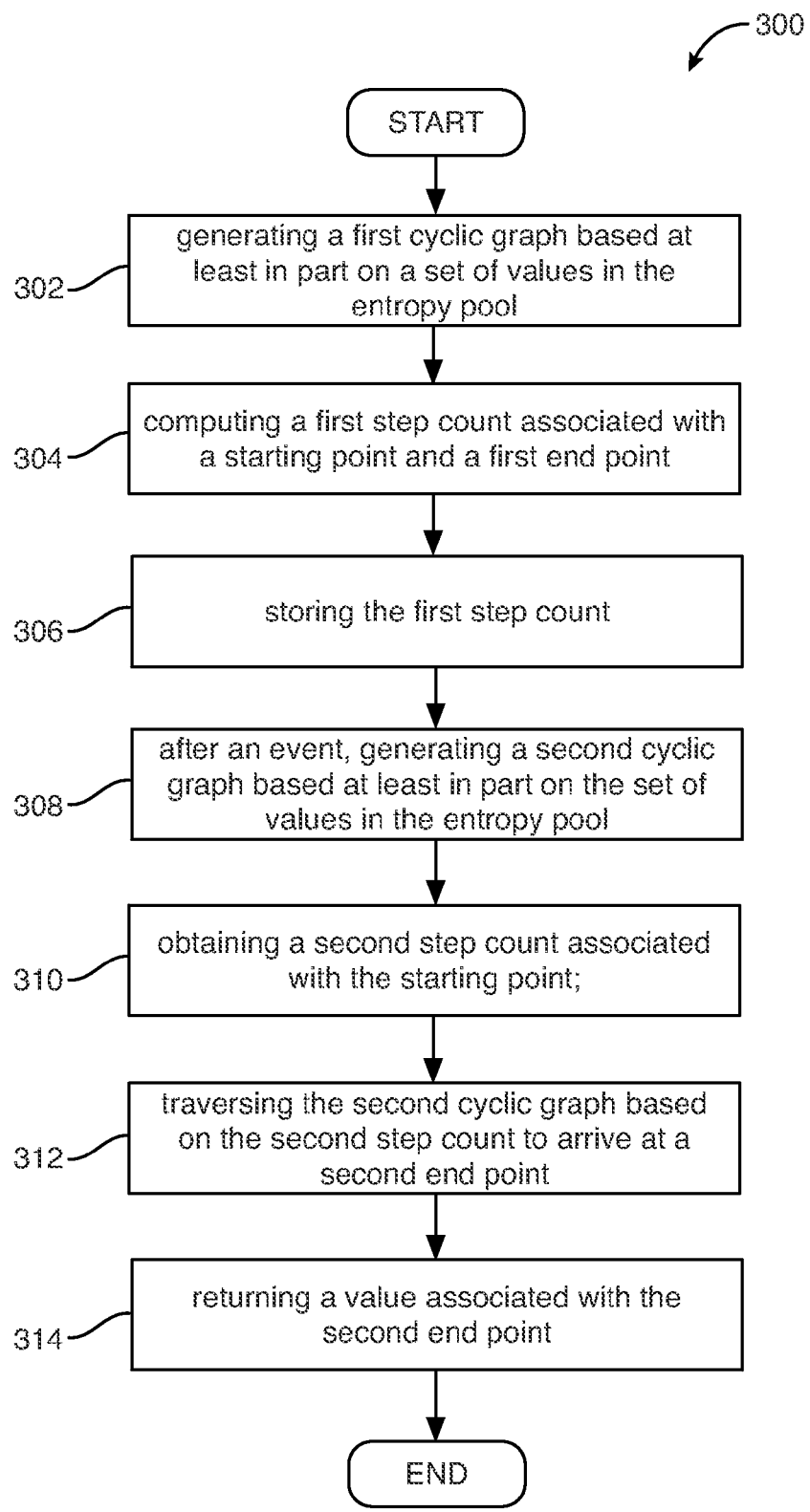
FIG. 3 illustrates a second example method embodiment.

FIG. 3 illustrates a second exemplary method embodiment 300. A suitably configured system 100 can perform any and/or all of the steps of the method. Although specific steps are shown in FIG. 3, in other embodiments a method can have more or less steps than shown. First, the system 100 generates a cyclic graph based at least in part on the set of values in the entropy pool (302). As in the previously described exemplary method embodiment 200, there are numerous ways to generate a cyclic graph from the set of values. Any technique used to generate the graph in exemplary method embodiment 200 can also be used herein.

After generating the cyclic graph, the system 100 computes a first step count associated with a starting point and a first end point (304). In some embodiments, the first step count can represent the minimum number of steps required to move from the starting point to the desired end point by moving from one vertex to a directly connected vertex. This approach would require the least amount of time to compute and would be the most straightforward, however, other approaches to computing the step count are possible. For example, the step count could be a multiple of the minimum number of steps or it could be the number of steps required to begin at the starting point, complete one cycle, and stop at the desired end point. In some embodiments, there can be multiple starting points that will all lead to the same end point. In such an embodiment, different starting points can be used at different points in the execution and/or different starting points can be used at the same execution point, but on different executions of the program.

Next, the system 100 stores the first step count (306). In some embodiments, the step count can be stored in a set of most significant bits of the starting point value. For example, if the value is 4 bytes, the step count can be stored in the most significant 2 bytes. While storing the step count with the starting point value is convenient, the step count can be stored anywhere and in any manner that allows for access at a later point in the execution.

At some later point, the system 100 generates a second cyclic graph based at least in part on the set of values in the entropy pool (308). The second cyclic graph is generated using the same technique as in step 302 so that if the entropy is unmodified the first cyclic graph and the second cyclic graph will be the same. The system 100 also obtains a second step count associated with the starting point (310). The second step count is obtained from the storage location used in step 306. For example, if the first step count was stored in the most significant 2 bytes of the starting point value, then the second step count is obtained from those bytes. If the entropy pool has been modified, it is possible that the first step was modified in the process and therefore, it is possible that the second step count could be different from the first step count.

Using the step count obtained in step 310, the system 100 traverses the second cyclic graph starting at the start point to arrive at a second end point (312). In some embodiments, the graph traversal will take the form of stepping from a first vertex to a second vertex that is directly connected to the first vertex, step count times. However, the traversal is not limited to a one-to-one relationship between the step count and the number of edges traversed. For example, the number of edges traversed could be a multiple of the step count.

Finally, the system 100 returns the value associated with the second end point identified in step 312 (314). Unlike the exemplary method embodiment 200 described above, which was an explicit detector, method 300 is an implicit detector. If the pool has been modified, the method 300 may return an incorrect value. Depending on how the returned value is used by the protection mechanism the protected software could, for example, fail immediately, fail at some point in the future, have limited functionality, or trigger any other action in software and/or hardware.

Figure 4:
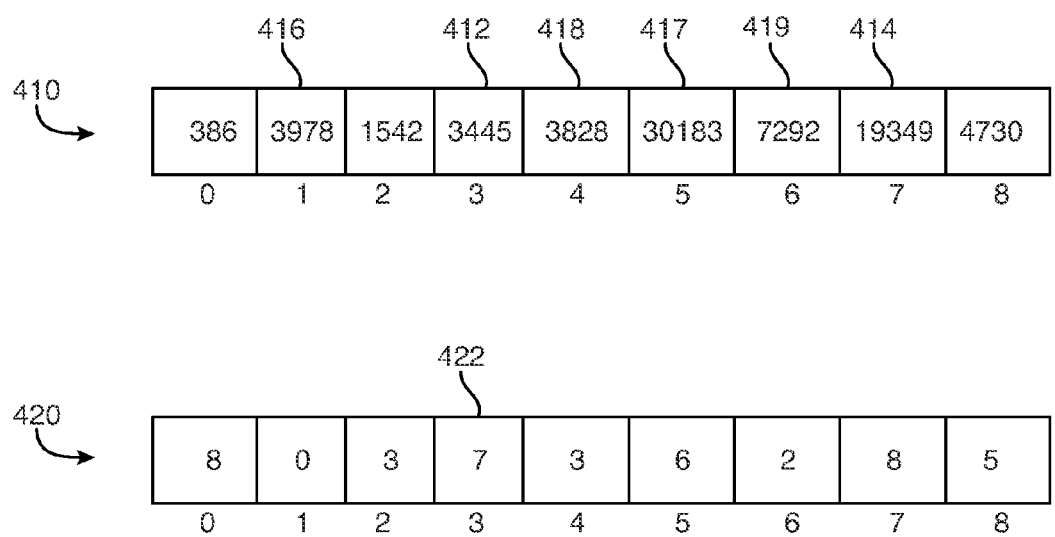
FIG. 4 illustrates an exemplary entropy pool and set of generated values.

The disclosure now turns to the first of two specific illustrative examples of detecting a change in the entropy pool 410. The first example illustrates detecting a change by way of exemplary method embodiment 200 in FIG. 2. FIG. 4 illustrates an example entropy pool 410 represented as an array of nine random values. The first half of the detection method establishes the baseline by generating a cyclic graph and computing a step count associated with a cycle in the graph. The baseline step count is then used at a later time for comparison purposes.

Figure 5:
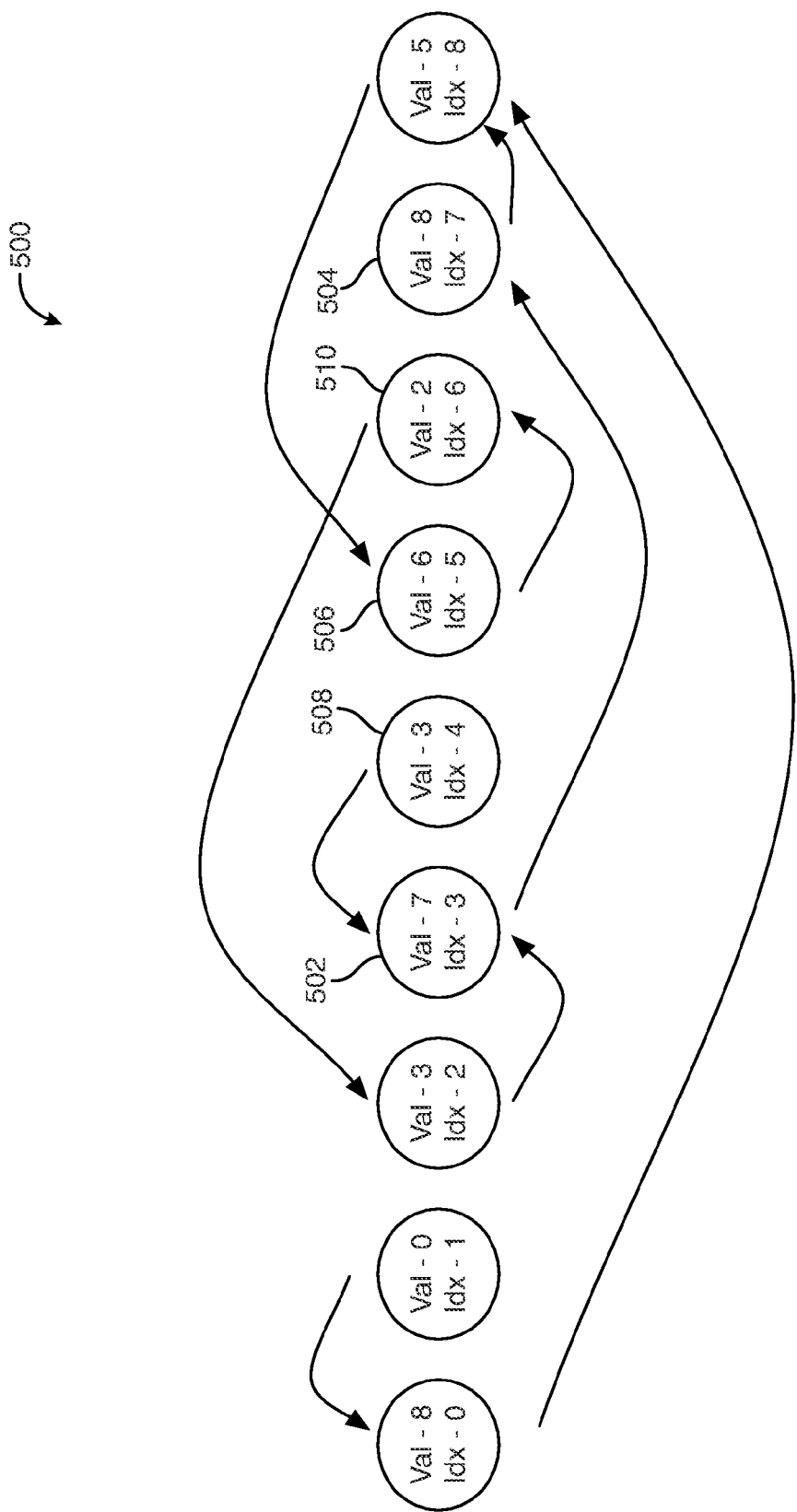
FIG. 5 illustrates a first cyclic graph generated from an exemplary entropy pool.

To generate the cyclic graph, a relationship between the values in the pool is created. In this example, the relationship between the values in the pool 410 is created using the modulus operation. The value modulo the size of the pool yields an index into the pool. Two values x and y are then connected if y is located at the index generated from x. After applying the modulus operation to each element in the pool 410, the set of values 420 is generated. For example, the value 7 (422) is generated for element 3445 at index 3 (412) in the pool 410. The values 420 are used to construct the cyclic graph 500 in FIG. 5. For example, the value 7 (422) that was generated for element 3445 (412) indicates that the vertex for element 3445 (502) should be connected to the element at index 7 in the pool 410, which is element 19349 (414) and vertex 504.

Figure 6:
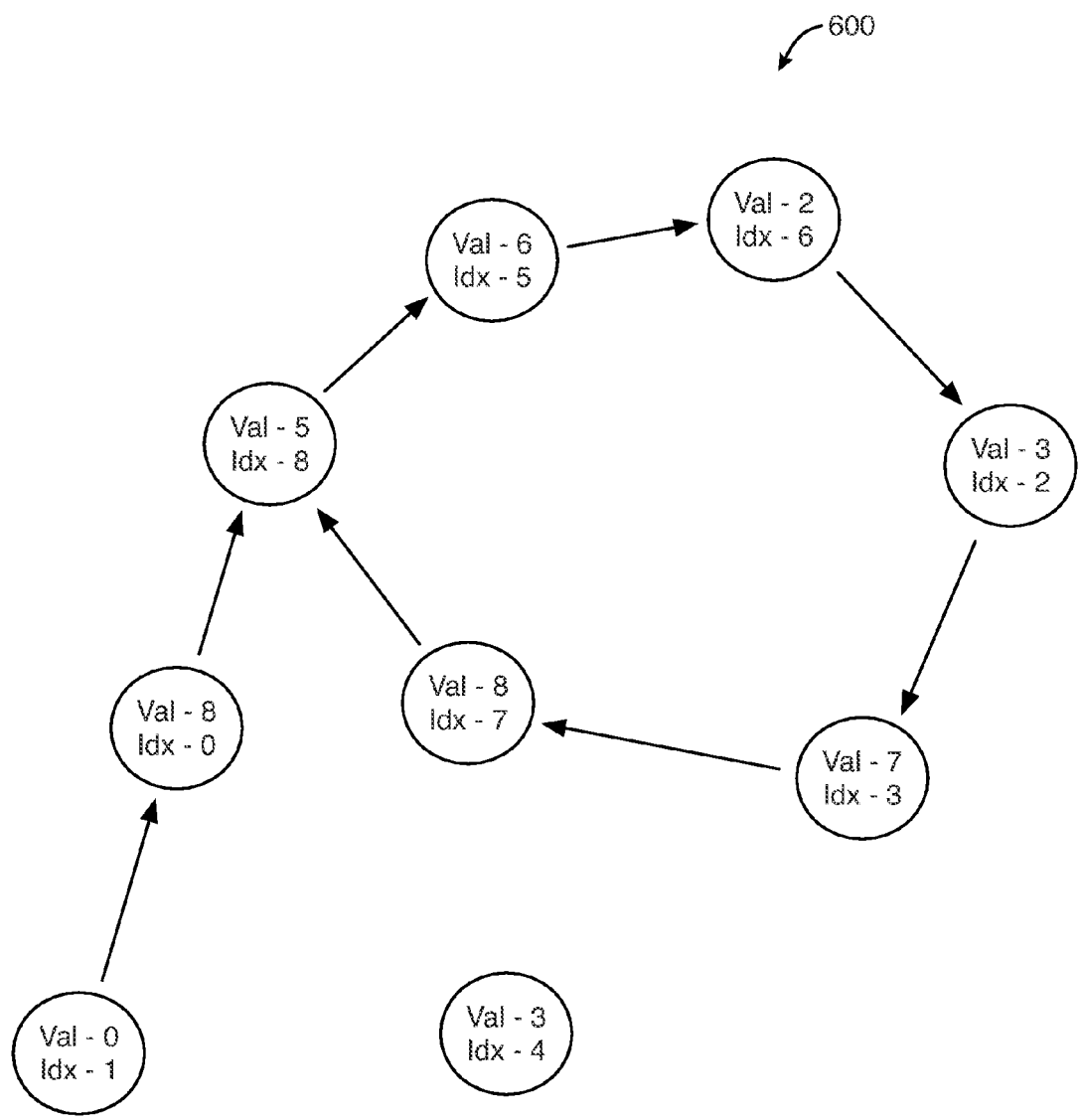
FIG. 6 illustrates a first set of vertices and edges reachable from an exemplary starting point.
Figure 7:
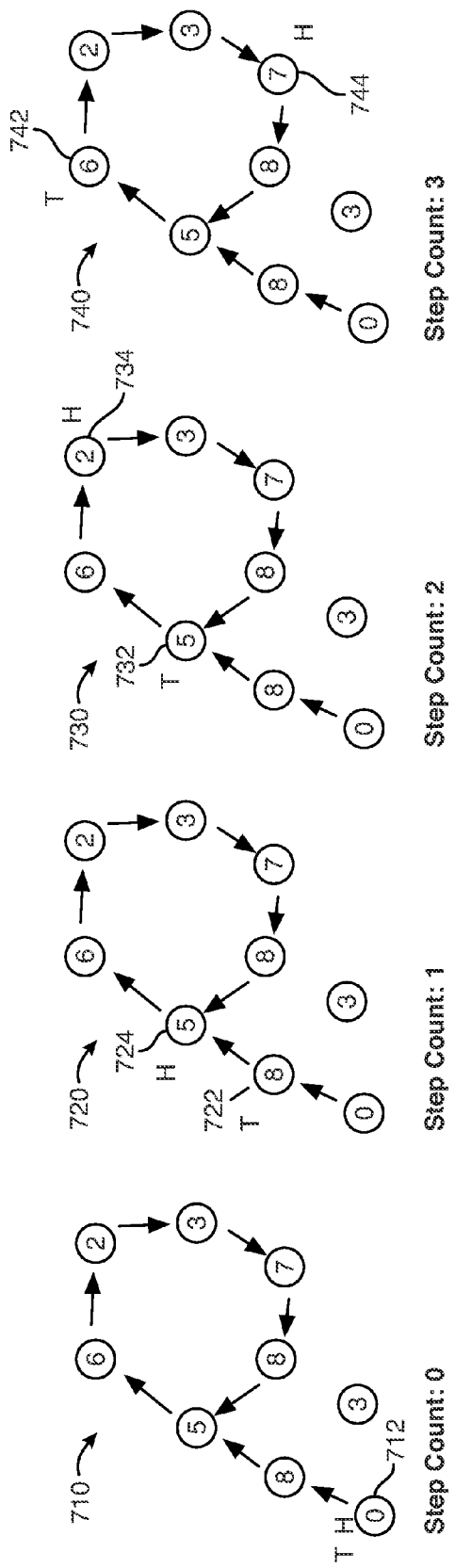
FIG. 7 illustrates an exemplary walk of the first cyclic graph to indentify a cycle.
Figure 7:
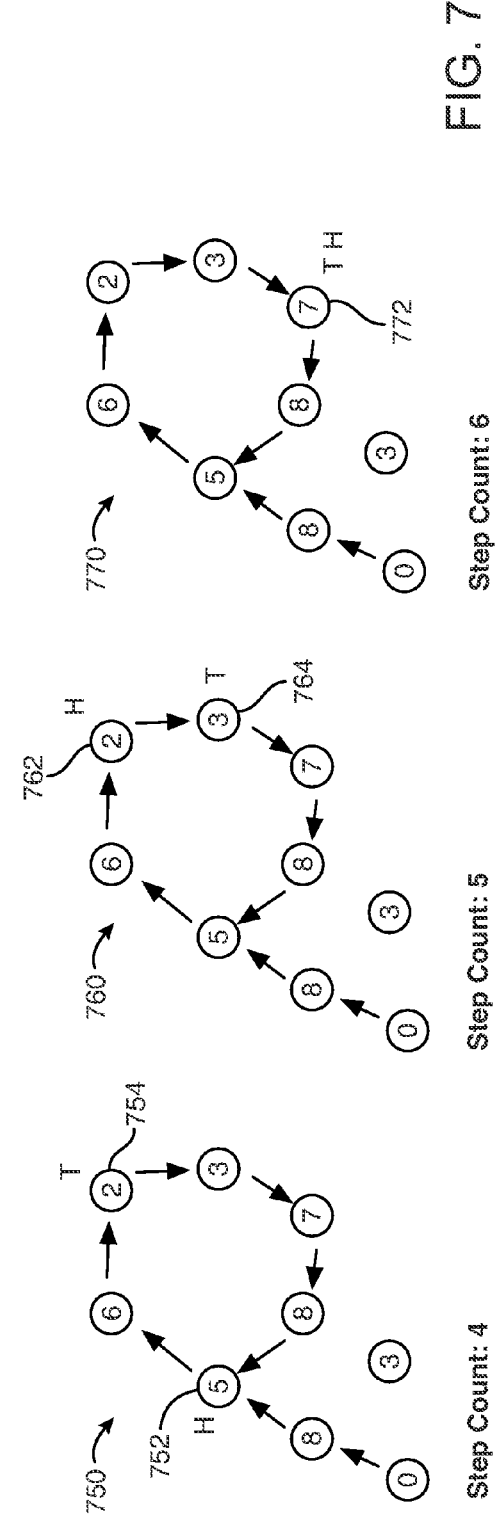

In this example, a single value is selected as a starting point: element 3978 at index 1 (416) in the pool 410. FIG. 6 depicts a graph 600 that illustrates the vertices and edges that are reachable from the starting point. To determine the first number of steps required to identify a cycle in the cyclic graph 600, the Tortoise and Hare algorithm is used. FIG. 7 illustrates the process of identifying the cycle. In graph 710, the Tortoise (T) and the Hare (H) both start at the starting vertex 712 and the step count is 0. At step count 1 (720), T moves one vertex to 722 and H moves two vertices to 724. At step count 2 (730), T moves one vertex to 732 and H moves two vertices to 734. This same process continues for step count 3 (740) for T (742) and H (744), step count 4 (750) for T (754) and H (752), and step count 5 (760) for T (764) and H (762), until finally detecting a cycle at step count 6 (770), where T and H point to the same vertex 772. At this point the system 100 has determined that 6 steps are required to identify a cycle. The step count of 6 is stored in the two most significant bytes of the starting value for later use.

Figure 8:
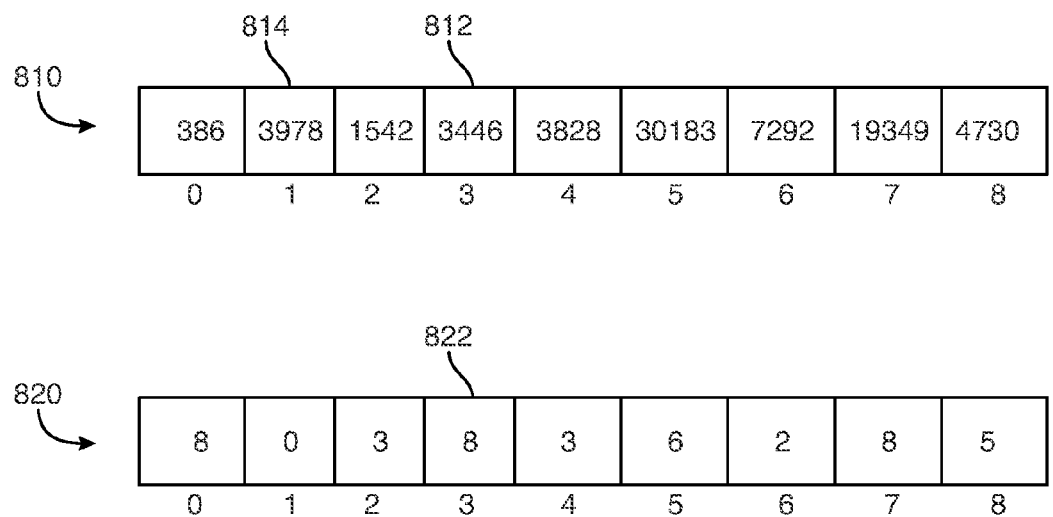
FIG. 8 illustrates an exemplary entropy pool and set of generated values that have been modified by an attacker.
Figure 9:
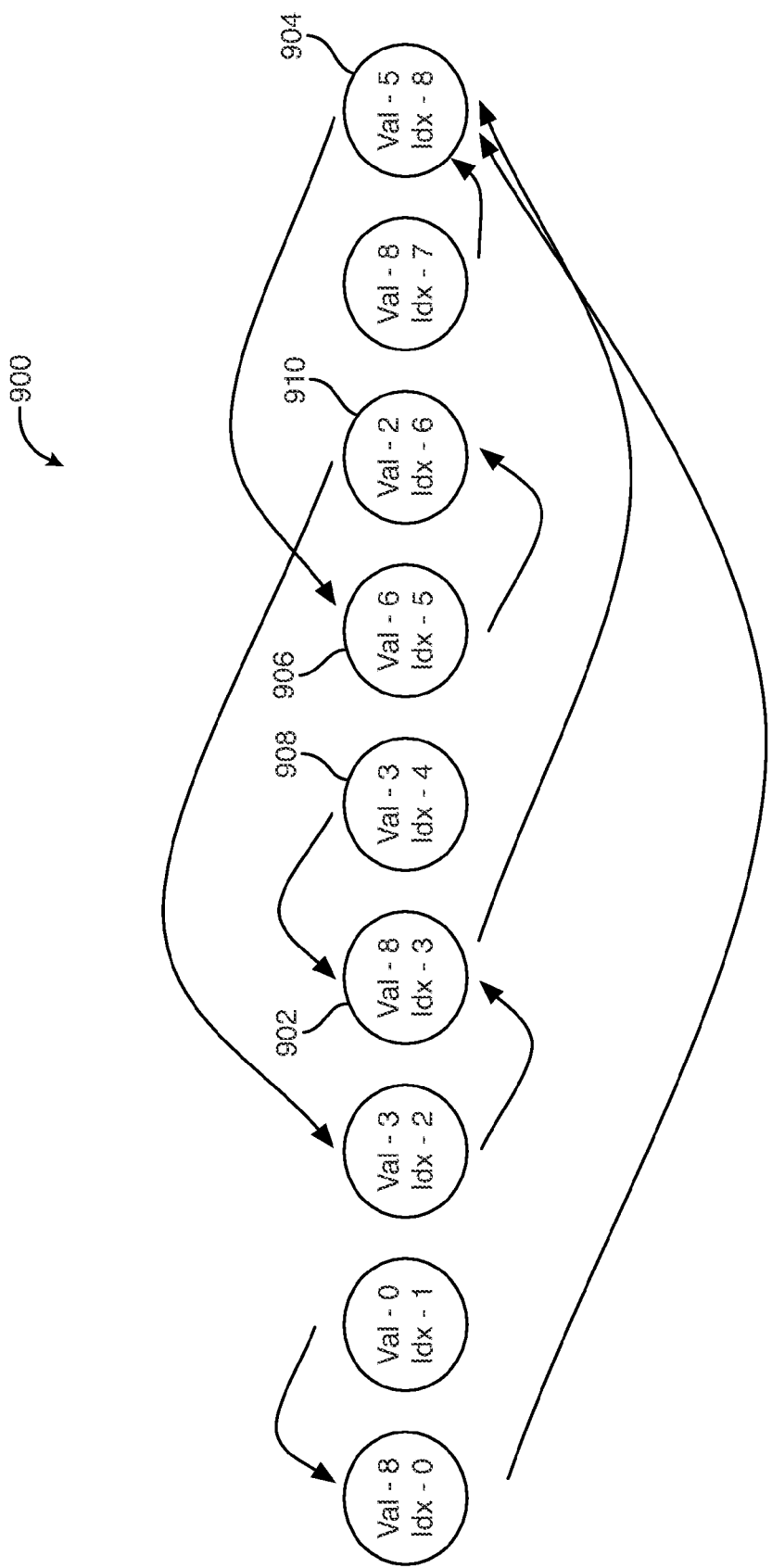
FIG. 9 illustrates a cyclic graph generated from an exemplary modified entropy pool.

At some point after initialization of the entropy pool 410, an attacker modifies the pool, producing the pool 810 in FIG. 8. The attacker's modification causes a change to the element at index 3 (812), changing it from 3445 to 3446. At some point after the attacker's modification, the detection method is triggered and the modulus operation is again applied to values in what is now the modified entropy pool 810 to generate the set of values 820. The attacker's modification results in a change to the value at index 3 (822), changing the value from 7 to 8. This modification is propagated to the cyclic graph 900 in FIG. 9. Vertices 902 and 906, which are equivalent to vertices 502 and 506 in the original cyclic graph 500, are now connected to vertices 904 and 910 respectively. Vertex 904 is not equivalent to vertex 504 in the original cyclic graph 500.

Figure 10:
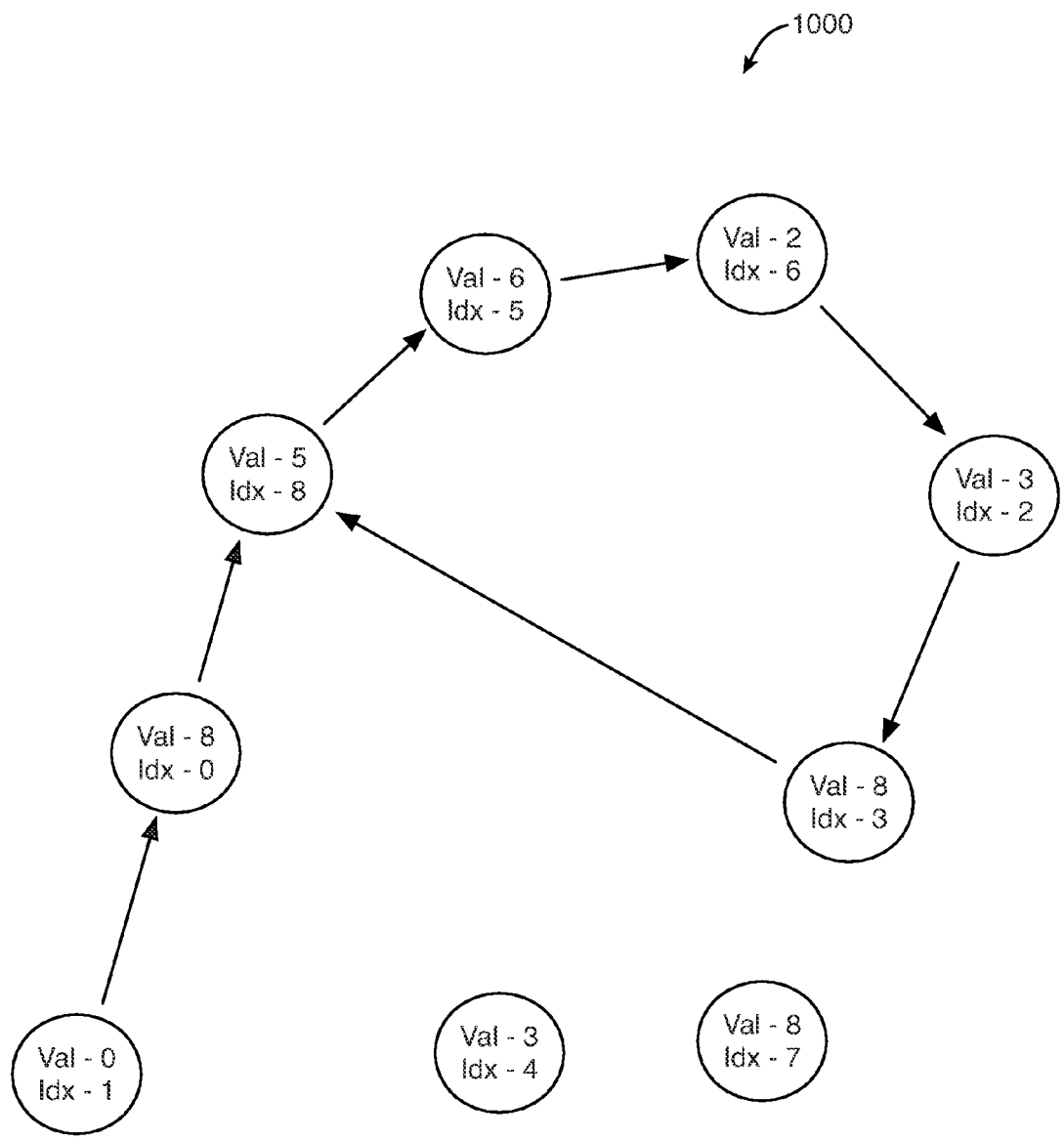
FIG. 10 illustrates a second set of vertices and edges reachable from an exemplary starting point in a modified cyclic graph.
Figure 11:
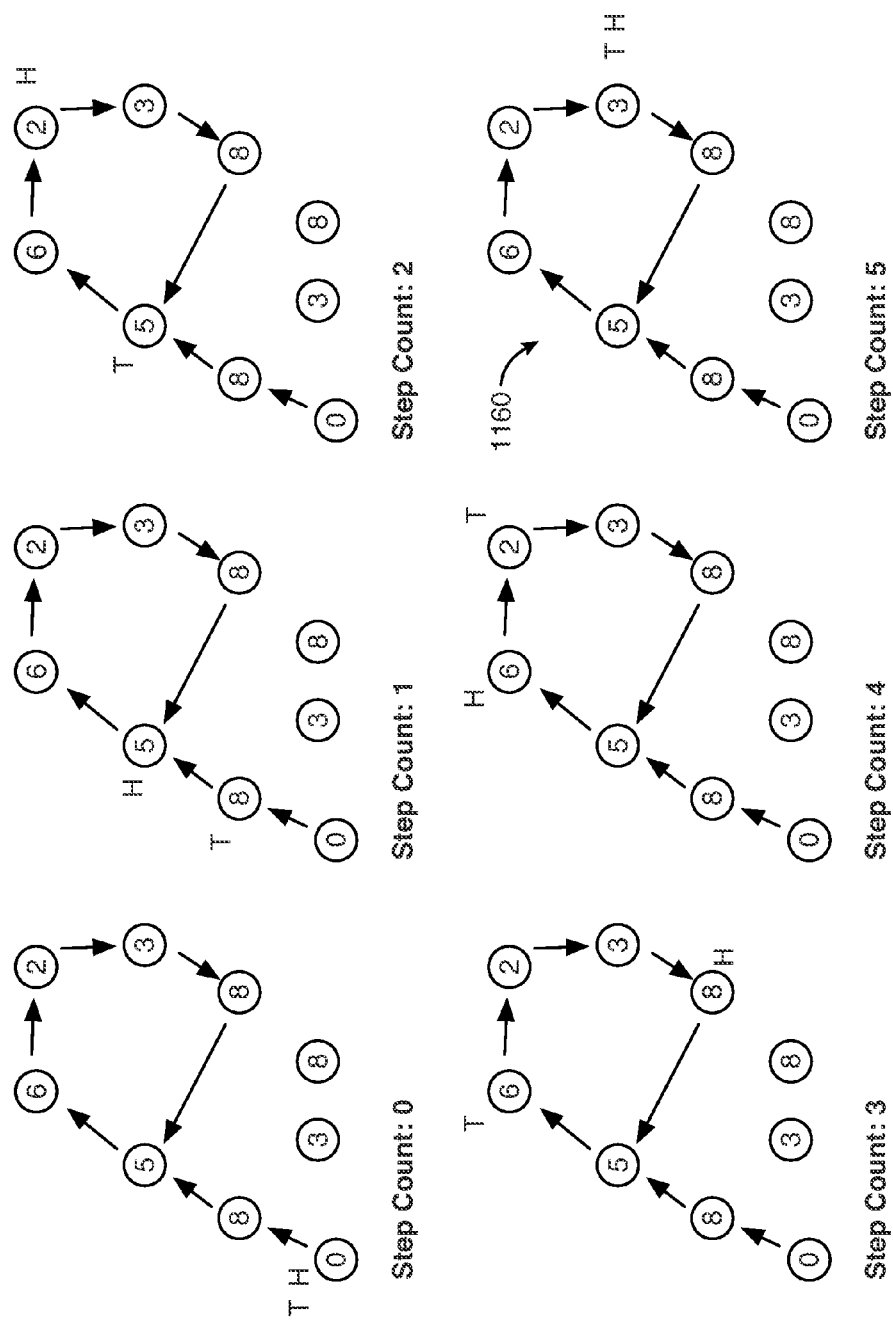
FIG. 11 illustrates an exemplary walk of a modified cyclic graph to identify a cycle.

Again, element 3978 (814) is selected as the starting point. FIG. 10 depicts a graph 1000 that illustrates the vertices and edges that are reachable from the starting point. From graph 1000 it can be seen that the number of vertices in the cycle has changed from 6 to 5. To determine the second number of steps required to identify a cycle in the cyclic graph 1000, the Tortoise and Hare algorithm is again used. FIG. 11 illustrates the process. Using the modified entropy pool 810, the step count is 5 (1160). This differs from the original step count of 6 (770) so the system 100 generates a flag.

The second example illustrates detecting a change by way of exemplary method embodiment 300 in FIG. 3. Again, FIG. 4 illustrates an example entropy pool 410 represented as an array of nine random values. The first half of the detection method establishes the baseline by generating a cyclic graph and computing one or more step counts associated with one or more starting points and an end point. The baseline step counts are then used at a later time to obtain the value associated with the end point.

As in the previous example, the modulus operation is used to create a relationship between the values in the pool 410. Applying the modulus operation produces the set of values 420 and the cyclic graph 500. In this example, a single value is selected as an end point: element 30183 at index 5 (417) in the pool 410; and two values are selected as starting points: element 3828 at index 4 (418) and element 7292 at index 6 (419). The number of steps required to reach the end point is calculated for each of the starting points by following the directed edges from one vertex to the next until the end point is reached. For example, one step is from vertex 506 to vertex 510. In this example, the step count for elements 3828 (508) and 7292 (510) the baseline step counts are 4 and 5, respectively. The step counts are stored in the two most significant bytes of the respective starting values for later use.

At some point after initialization of the entropy pool 410, an attacker modifies the pool, producing the pool 810 in FIG. 8. The attacker's modification causes a change to the element at index 3 (812), changing it from 3445 to 3446. At some point after the attacker's modification, the detection method is triggered and the modulus operation is again applied to values in what is now the modified entropy pool 810 to generate the set of values 820. The attacker's modification results in a change to the value at index 3 (822), changing the value from 7 to 8. This modification is propagated to the cyclic graph 900 in FIG. 9. Vertex 902, which is equivalent to vertex 502 in the original cyclic graph 500, is now connected to vertex 904, which is not equivalent to vertex 504 in the original cyclic graph 500.

To obtain the value associated with the end point either starting point 908 or 910 can be selected. At this point in the execution, starting point 908 is selected and the step count of 4 is extracted from the 2 most significant bytes of the starting point. The system 100 then traverses the cyclic graph 900 by following the directed edges from one vertex to the next until step count edges have been traversed. In this example, starting at vertex 908 and traversing 4 edges yields end point vertex 910 with an associated value of 7292. This is not the original end point value selected in the baseline phase and thus the detection method has detected a change in the pool 410. Because detection method 300 is an implicit detector, actually recognizing the detection is the responsibility of code that requested the value associated with the end point.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method of detecting a change to a pool of random numbers, the method comprising:
    applying an operation to each element in the pool to generate a first set of values, wherein each value in the first set of values relates to an association of a first element in the pool with a second element in the pool;
    generating a first cyclic graph based at least in part on the first set of values;
    determining a first number of steps required to identify a first cycle in the first cyclic graph from a first starting point in the first cyclic graph;
    after an event, applying the operation to each element in the pool to generate a second set of values;
    generating a second cyclic graph based at least in part on the second set of values;
    determining a second number of steps required to identify a second cycle in the second cyclic graph from a second starting point in the second cyclic graph associated with the first starting point; and
    generating a flag if the first number of steps and the second number of steps differ;
    wherein the flag is used in a protection mechanism in an obfuscated program.

2. The method of claim 1, wherein, for at least one value, the first element and the second element are a same element.

3. The method of claim 1, wherein the operation is a modulus operation by a size of the pool.

4. The method of claim 1, wherein a single step in determining the first number of steps required to identify the first cycle in the first cyclic graph comprises:
    moving from a first vertex in the first cyclic graph to a second vertex in the first cyclic graph which is directly connected to the first vertex.

5. The method of claim 1, wherein a single step in determining the second number of steps required to identify the second cycle in the second cyclic graph comprises:
    moving from a first vertex in the second cyclic graph to a second vertex in the second cyclic graph which is directly connected to the first vertex.

6. The method of claim 1, wherein the first number of steps is stored in a set of most significant bits of the starting point.

7. The method of claim 1, wherein the first cycle and the second cycle are a same cycle.

8. A system of detecting a change to a pool of random numbers, the system comprising:
    a processor;
    a first module configured to control the processor to generate a cyclic graph based at least in part on a set of values in the pool, wherein each value in the set of values relates to an association of a first element in the pool and a second element in the pool;
    a second module configured to control the processor to compute a first number of steps required to identify a first cycle in the first cyclic graph from a first starting point;
    a third module configured to control the processor to monitor the pool, generate a second cyclic graph, and calculate a second number of steps required to identify a second cycle in the second cyclic graph from a second starting point in the second cyclic graph associated with the first starting point; and
    a fourth module configured to control the processor to generate a flag when the first number of steps and the second number of steps differ;
    wherein the flag is used in a protection mechanism in an obfuscated program.

9. The system of claim 8, the first module further comprising:
    a fifth module configured to control the processor to create a unique vertex for each value in the set of values in the pool, where the unique vertex stores a value and an index into the pool; and
    a sixth module configured to control the processor to connect a vertex x to a vertex y when an x value associated with the vertex x modulo a size of the pool equals an index associated with the vertex y.

10. The system of claim 9, wherein the x value associated with the vertex x is 4 bytes.

11. The system of claim 8, wherein the second module is further configured to control the processor to perform steps comprising:
    initializing a step counter;
    marking the starting vertex as seen; and
    repeatedly stepping from a first vertex in the cyclic graph to a second vertex in the cyclic graph that is directly connected to the first vertex when the second vertex has not been marked as seen, incrementing the step counter, and marking the second vertex as seen.

12. The system of claim 8, wherein the second module is further configured to control the processor to compute a minimum number of steps required to identify the cycle in the cyclic graph.

13. A non-transitory computer-readable storage medium storing instructions which, when executed by a computing device, causes the computing device to detect a change to a pool of random numbers, the instructions comprising:
  applying an operation to each element in the pool to generate a first set of values, wherein each value in the first set of values relates to an association of a first element in the pool with a second element in the pool;
  generating a first cyclic graph based at least in part on the first set of values;
  computing a first number of steps required to identify a first cycle in the first cyclic graph from a starting point;
  storing the first number of steps in the pool of random numbers;
  at some later time, applying the operation to each element in the pool to generate a second set of values;
  generating a second cyclic graph based at least in part on the second set of values;
  determining a second number of steps required to identify a second cycle in the second cyclic graph from the starting point; and
  generating a flag if the first number of steps and the second number of steps differ;
  wherein the flag is used in a protection mechanism in an obfuscated program.

* * * * *

UNITED STATES PATENT AND TRADEMARK OFFICE
CERTIFICATE OF CORRECTION

PATENT NO. : 8,656,363 B2
APPLICATION NO. : 12/815298
DATED : February 18, 2014
INVENTOR(S) : Jon McLachlan et al.

Page 1 of 1

It is certified that error appears in the above-identified patent and that said Letters Patent is hereby corrected as shown below:

In the Claims

In Claim 1, Column 11, line 65, please change "steps; differ;" to --steps differ;--.

Signed and Sealed this
Eighth Day of July, 2014

Michelle K. Lee
*Deputy Director of the United States Patent and Trademark Office*